(12) United States Patent
Ketlerius et al.

(10) Patent No.: US 11,623,613 B2
(45) Date of Patent: Apr. 11, 2023

(54) OPTICAL RAIN SENSOR

(71) Applicant: Littelfuse, Inc., Chicago, IL (US)

(72) Inventors: Mindaugas Ketlerius, Kaunas (LT); Mangirdas Rasiulis, Kaunas (LT)

(73) Assignee: Littelfuse, Inc., Chicago, IL (US)

(*) Notice: Subject to any disclaimer, the term of this patent is extended or adjusted under 35 U.S.C. 154(b) by 524 days.

(21) Appl. No.: 16/821,492

(22) Filed: Mar. 17, 2020

(65) Prior Publication Data

US 2020/0298802 A1    Sep. 24, 2020

Related U.S. Application Data

(60) Provisional application No. 62/820,983, filed on Mar. 20, 2019.

(51) Int. Cl.
  B60S 1/08      (2006.01)
  G01N 21/84     (2006.01)
  G01N 21/55     (2014.01)

(52) U.S. Cl.
  CPC ............ B60S 1/0837 (2013.01); B60S 1/087 (2013.01); B60S 1/0888 (2013.01); G01N 21/55 (2013.01); G01N 21/84 (2013.01)

(58) Field of Classification Search
  CPC .... B60S 1/0837; B60S 1/0833; B60S 1/0822; B60S 1/0818; B60S 1/08; B60S 1/087; B60S 1/0874; B60S 1/0888; B60S 1/0881; G01N 21/55; G01N 21/84
  See application file for complete search history.

(56) References Cited

U.S. PATENT DOCUMENTS

| 6,455,866 | B1 | 9/2002 | Pientka |
| 6,526,820 | B1* | 3/2003 | Schmid ................. B60S 1/0888 |
| | | | 340/602 |
| 6,634,225 | B1 | 10/2003 | Reime |
| 10,488,557 | B2 | 11/2019 | Fesshaie et al. |
| 11,084,463 | B2* | 8/2021 | Ketlerius .............. B60S 1/0837 |
| 2011/0242540 | A1 | 10/2011 | Shyu et al. |
| 2017/0001600 | A1* | 1/2017 | Lee ........................ G01N 21/552 |
| 2018/0128942 | A1* | 5/2018 | Fesshaie ............... G01J 1/4228 |
| 2019/0389431 | A1* | 12/2019 | Ketlerius .............. B60S 1/0837 |
| 2020/0298802 | A1* | 9/2020 | Ketlerius ................ B60S 1/087 |

FOREIGN PATENT DOCUMENTS

EP    0919443 A2    6/1999

OTHER PUBLICATIONS

European Search Report dated Aug. 10, 2020 for European Patent Application 20164268.3.

* cited by examiner

*Primary Examiner* — John R Lee
(74) *Attorney, Agent, or Firm* — KDW Firm Pllc

(57) ABSTRACT

An optical rain sensor including a plurality of light detecting elements and a plurality of peripheral light emitting elements disposed on a printed circuit board (PCB) and surrounding a central light emitting element disposed on the PCB, wherein, in a first mode of operation, the central light emitting element is configured to emit light beams toward the plurality of light detecting elements, and wherein, in a second mode of operation, each of the peripheral light emitting elements is configured to emit light beams toward the plurality of light detecting elements.

20 Claims, 2 Drawing Sheets

OPTICAL RAIN SENSOR

CROSS-REFERENCES TO RELATED APPLICATIONS

This application claims the benefit of U.S. Provisional Patent Application No. 62/820,983, filed Mar. 20, 2019, which is incorporated by reference herein in its entirety.

FIELD OF THE DISCLOSURE

This disclosure relates generally to the field of sensors, and more particularly to an optical rain sensor configured to detect rainfall on a transparent substrate such as an automobile windshield.

BACKGROUND OF THE DISCLOSURE

Modern automobiles are commonly equipped with rain sensors that are configured to detect rainfall on an automobile's windshield. Information gathered from such sensors can be used to automatically activate and vary the speed of an automobile's windshield wipers and/or to control various other systems in an automobile (e.g., a traction control system).

Referring to FIG. 1, a schematic diagram illustrating a top view of a conventional optical rain sensor 10 (hereinafter "the rain sensor 10") is shown. In a typical application, the rain sensor 10 is mounted to an underside (i.e., interior side) of a transparent substrate such as an automobile windshield. The rain sensor 10 includes six light emitting elements 12a-f (e.g., light emitting diodes) disposed about a periphery of the rain sensor 10, collimating lenses 14a-f adapted to collimate light emitted by the light emitting elements 12a-f and to direct the collimated light toward respective sensing areas 15a-f on the windshield, focusing lenses 16a-f adapted to receive the collimated light that is reflected off of the windshield and to focus the light, and a light detecting element 17 (e.g., a photodiode) located at the center of the rain sensor 10 that is adapted to receive the focused light from the focusing lenses 16a-f and to convert the received light into an electrical output signal that is transmitted to a controller 18. If water (e.g., rain) is present at one of the six sensing areas 15a-f on the exterior of the windshield, a portion of collimated light that strikes the sensing area will be refracted into the water instead of being reflected to a respective focusing lens. Thus, the amount of collimated light that is reflected off the sensing area of the windshield and received by the light detecting element is generally attenuated relative to when the sensing area of the windshield is dry.

During operation of the rain sensor 10, the controller 18 alternatingly activates and deactivates two groups A and B of the light emitting elements 12a-f and simultaneously monitors output from the light detecting element 17. That is, when the light emitting elements 12a-c are activated the light emitting elements 12d-f are deactivated, and vice versa. When the windshield is dry, the output produced by the light detecting element 17 when group A of the light emitting elements 12a-f is activated will be substantially similar to the output produced by the light detecting element 17 when group B of the light emitting elements 12a-f is activated. However, when the windshield is wet, water may be present at one or more of the six sensing areas 15a-f on the windshield. Thus, since some amount of light emitted by one or more of the light emitting elements 12a-f will be refracted at the wet sensing area(s) instead of being reflected to the light detecting element, there will be an imbalance between the output produced by the light detecting element 17 when group A of the light emitting elements 12a-f is activated and the output produced by the light detecting element 17 when group B of the light emitting elements 12a-f is activated. Upon the detection of such an imbalance, the controller 18 may determine that the windshield is wet and may influence the operation of other automobile systems (e.g., windshield wipers) accordingly.

Conventional rain sensors of the type described above include a total of seven optical elements (i.e., six light emitting elements 12a-f and one light detecting element 17) and are capable of detecting the presence of moisture at six discrete sensing areas (i.e., sensing areas 15a-f). It would be desirable to provide a rain sensor that has greater sensitivity than a conventional rain sensor and that can be implemented at substantially the same cost and in substantially the same form factor as a conventional rain sensor.

It is with respect to these and other considerations that the present improvements may be useful.

SUMMARY

This Summary is provided to introduce a selection of concepts in a simplified form further described below in the Detailed Description. This Summary is not intended to identify key features or essential features of the claimed subject matter, nor is the summary intended as an aid in determining the scope of the claimed subject matter.

An exemplary embodiment of an optical rain sensor in accordance with the present disclosure may include a plurality of light detecting elements and a plurality of peripheral light emitting elements disposed on a printed circuit board (PCB) and surrounding a central light emitting element disposed on the PCB, wherein, in a first mode of operation, the central light emitting element is configured to emit light beams toward the plurality of light detecting elements, and wherein, in a second mode of operation, each of the peripheral light emitting elements is configured to emit light beams toward the plurality of light detecting elements.

Another exemplary embodiment of an optical rain sensor in accordance with the present disclosure may include four light emitting elements disposed on a printed circuit board (PCB), wherein three of the light emitting elements are disposed at respective corners of a first imaginary equilateral triangle and the fourth light emitting element is disposed at a center of the first imaginary equilateral triangle, three light detecting elements disposed on the PCB at respective corners of a second imaginary equilateral triangle, wherein the second imaginary equilateral triangle is concentric with, and is rotationally offset by 60 degrees relative to, the first imaginary equilateral triangle, wherein, in a first mode of operation, the light emitting element the center of the first imaginary triangle is configured to emit three separate light beams toward the three light detecting elements, respectively, and wherein, in a second mode of operation, the light emitting elements at the corners of the first imaginary equilateral triangle are each configured to emit two separate light beams toward a nearest two of the light detecting elements.

DETAILED DESCRIPTION

An optical rain sensor in accordance with the present disclosure will now be described more fully with reference to the accompanying drawings, in which a preferred embodiment of the optical rain sensor is presented. The optical rain sensor, however, may be embodied in many different forms and should not be construed as being limited to the embodiments set forth herein. Rather, these embodiments are provided so that this disclosure will convey certain exemplary aspects of the optical rain sensor to those skilled in the art.

Figure 2A:
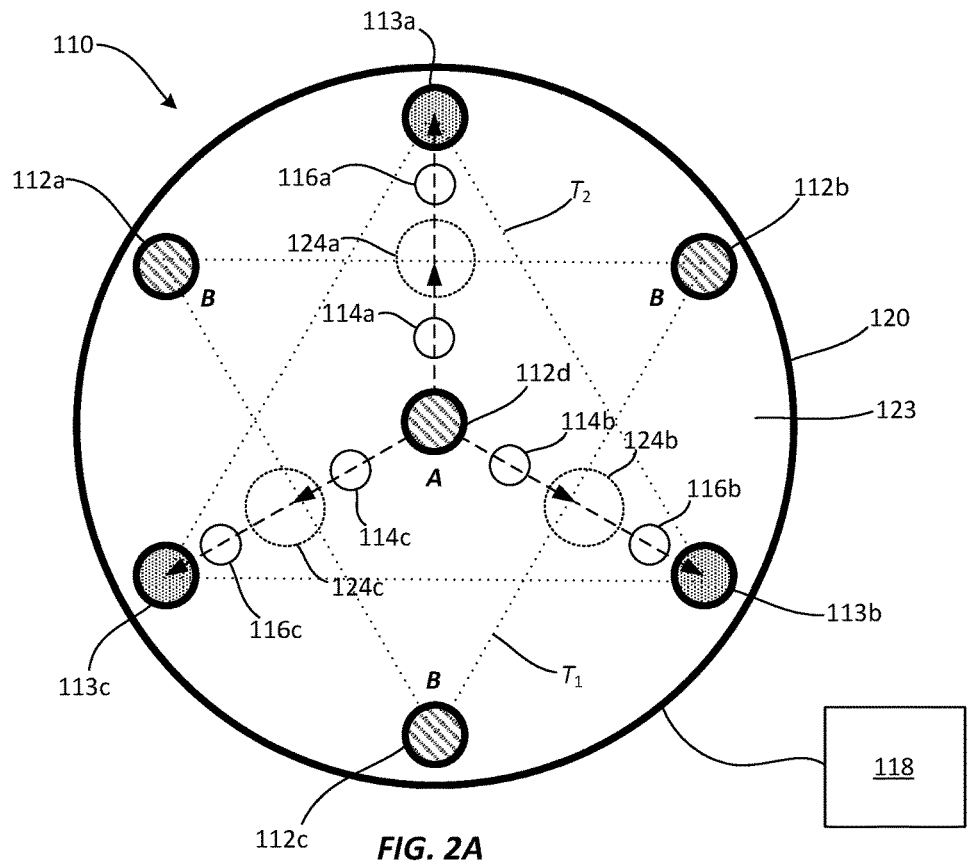
FIG. 2A is schematic diagram illustrating a top view of a rain sensor in accordance with an exemplary embodiment of the present disclosure in a first mode of operation.
Figure 2B:
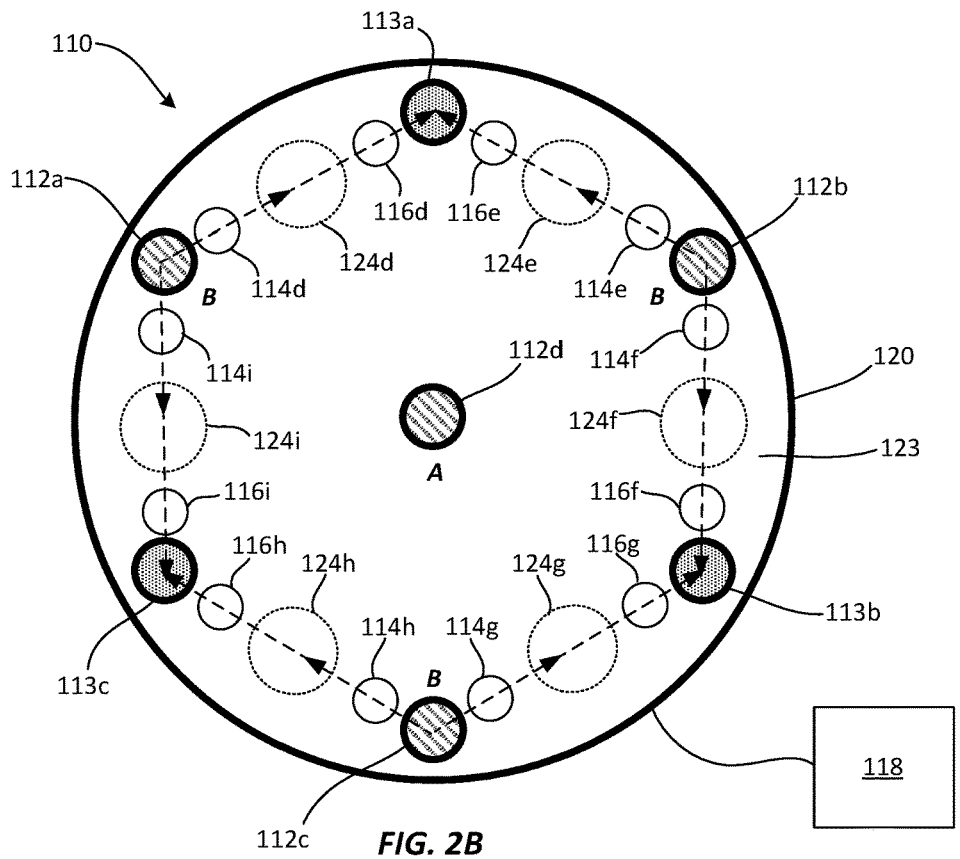
FIG. 2B is schematic diagram illustrating a top view of the rain sensor shown in FIG. 2A in a second mode of operation.

Referring to FIGS. 2A and 2B, schematic diagrams illustrating top views of an optical rain sensor (hereinafter "the rain sensor 110") in accordance with an exemplary embodiment of the present disclosure are shown. In the depicted, non-limiting embodiment, the rain sensor 110 may generally include a plurality of light emitting elements 112a-d, a plurality of light detecting elements 113a-c, a plurality of collimating lenses 114a-i, and a plurality of focusing lenses 116a-i disposed within a housing 120. For the sake of clarity, the collimating lenses 114d-i and the focusing lenses 116d-i are omitted from FIG. 2A, and the collimating lenses 114a-c and the focusing lenses 116a-c are omitted from FIG. 2B. The light emitting elements 112a-d and light detecting elements 113a-c may be operatively mounted on a printed circuit board (PCB) 123 in electrical communication with a controller 118 (e.g., a microcontroller, application specific integrated circuit (ASIC), etc.) configured to provide electrical power to, dictate the operation of, and/or gather data from, the light emitting elements 112a-d and the light detecting elements 113a-c. The collimating lenses 114a-i and the focusing lenses 116a-i may be disposed intermediate the light emitting elements 112a-d and light detecting elements 113a-c (as further described below) and may be mounted or affixed to the housing 120 (e.g., to a transparent cover of the housing, not shown).

The housing 120 may adapted for installation on or adjacent a transparent substrate. For example, the housing 120 may be mounted on an interior surface of an automobile windshield in a manner that will be familiar to those of ordinary skill in the art. In some embodiments, the controller 118 may be disposed within the housing 120 and mounted on the PCB 123. Alternatively, the controller 118 may be located outside of the housing 120, remote from the PCB 123.

The light emitting elements 112a-d of the rain sensor 100 may be light emitting diodes (LEDs) configured to selectively emit light (e.g. infrared light). For example, each of the light emitting elements 112a-d may be configured to emit light when activated by the controller 118 (i.e., when electrical power is applied thereto by the controller 118). The light detecting elements 113a-c may be photodiodes or similar devices configured to receive light and to output corresponding electrical signals to the controller 18. There may be a total of four light emitting elements 112a-d arranged in a "Y" configuration on the PCB 123, with the light emitting elements 112a-c disposed adjacent a periphery of the PCB 123 at the corners of an imaginary equilateral triangle $T_1$ (FIG. 2A), and with the light emitting element 112d disposed at the center of the imaginary equilateral triangle $T_1$. There may be a total of three light detecting elements 113a-c arranged in a triangular configuration, with the light detecting elements 113a-c disposed adjacent a periphery of the PCB 123 at the corners of an imaginary equilateral triangle $T_2$ (FIG. 2A), wherein the imaginary equilateral triangle $T_2$ is concentric with, and is rotationally offset by 60 degrees relative to, the imaginary equilateral triangle $T_1$.

Each of the light emitting elements 112a-d may be configured to emit two or more light beams toward two or more of the light detecting elements 113a-c as further described below. Each of the collimating lenses 114a-i may be configured (e.g., positioned and oriented) to receive and to collimate a light beam emitted by a nearest one of the light emitting elements 112a-d and to direct the collimated light beam toward a respective sensing area 124a-i on a transparent substrate (e.g., a windshield, not shown) to which the rain sensor 110 is affixed, where at least a portion of the collimated light beam is reflected off the transparent substrate as further described below. Each of the focusing lenses 116a-i may be configured (e.g., positioned and oriented) to receive light that is reflected off the transparent substrate 126 and to focus the received light onto a respective, nearest one of the light detecting elements 113a-c as further described below. In various alternative embodiments of the present disclosure, the collimating lenses 114a-i and the focusing lenses 116a-i of the rain sensor 110 may be omitted, and the housing 120 may be filled with a transparent compound (e.g., a silicone fluid or gel) having an index of refraction similar or equal to that of the transparent cover of the housing 120, thereby obviating the need for collimating lenses and focusing lenses to accommodate refraction of the light beams between the light emitting elements 112a-d and light detecting elements 113a-c.

The rain sensor 110 may be configured to rapidly and continuously alternate between first and second modes of operation that are depicted in FIGS. 2A and 2B, respectively. In the first mode of operation shown in FIG. 2A, the controller 118 may activate the single light emitting element 112d (which may be referred to as "the central light emitting element 112d") at the center of the PCB 123, wherein the light emitting element 112d is configured to emit three separate light beams toward light detecting elements 113a-c. The light beams emitted by the light emitting element 112d may be collimated by the collimating lenses 114a-c, reflected at the sensing areas 124a-c, and focused by the focusing lenses 116a-c in the manner described above. The resultant light received by the light detecting elements 113a-c may be converted into respective electrical signals that are transmitted to the controller 118. The electrical signals received by the controller 118 may therefore correspond to an amount of light reflected at the sensing areas 124a-c.

In the second mode of operation shown in FIG. 2B, the controller 118 may activate the light emitting elements 112a-c (which may be referred to as "the peripheral light emitting elements 112a-c") at adjacent the periphery of the PCB 123, wherein the light emitting elements 112a-c are each configured to emit two separate light beams toward the two nearest light detecting elements 113a-c. That is, the light emitting element 112a may emit a beam of light toward each of the light detecting elements 113a and 113c, the light emitting element 112b may emit a beam of light toward each of the light detecting elements 113a and 113b, and the light emitting element 112c may emit a beam of light toward each of the light detecting elements 113b and 113c. The light beams emitted by the light emitting elements 112da-c may be collimated by the collimating lenses 114d-i, reflected at the sensing areas 124d-i, and focused by the focusing lenses 116d-i in the manner described above. The resultant light received by the light detecting elements 113a-c may be converted into respective electrical signals that are transmitted to the controller 118. The electrical signals received by the controller 118 may therefore correspond to an amount of light reflected at the sensing areas 124d-i.

When the transparent substrate is dry, the output produced by the light detecting elements 113a-c in the first mode of operation may be substantially equal to the output produced by the light detecting elements 113a-c in the second mode of operation (i.e., when the output is appropriately scaled by the controller 118). However, when the transparent substrate is wet, water may be present at one or more of the sensing areas 124a-i. Thus, since some amount of light emitted by one or more of the light emitting elements 112a-d will be refracted at the wet sensing area(s) instead of being reflected to the light detecting elements 113a-c, there will be an imbalance between the output produced by the light detecting elements 113a-c in the first mode of operation and the output produced by the light detecting elements 113a-c in the second mode of operation. Upon the detection of such an imbalance, the controller 118 may determine that the transparent substrate is wet and may influence the operation of other automobile systems (e.g., windshield wipers, traction control, etc.) accordingly.

Figure 1A:
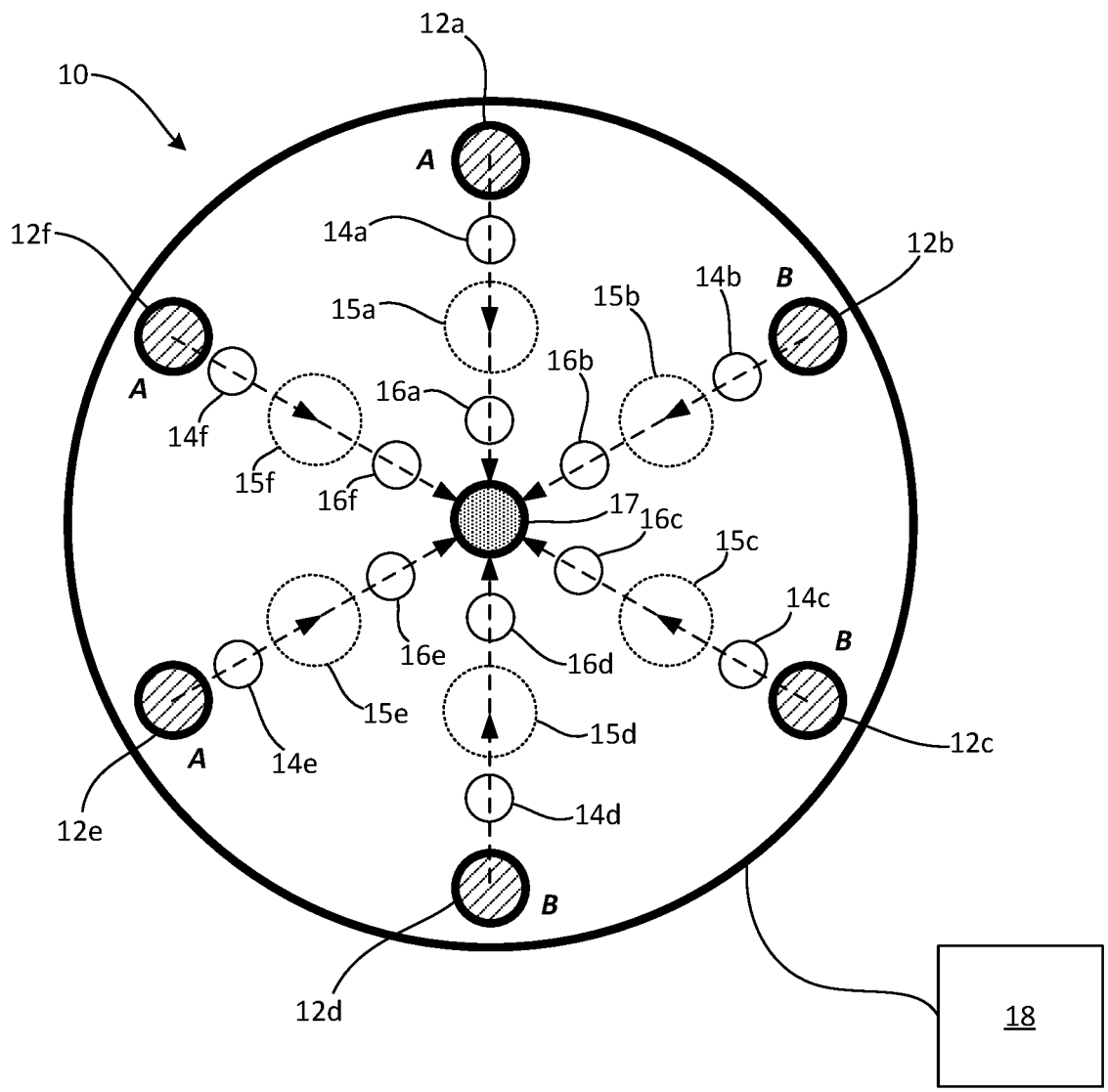
FIG. 1A is schematic diagram illustrating a top view of a conventional rain sensor consistent with the prior art.

As described above, the rain sensor 110 includes a total of seven optical elements (i.e., four light emitting elements 112a-d and three light detecting elements 113a-c) and is capable of detecting the presence of moisture at nine discrete sensing areas 124a-i that are evenly distributed over the footprint of the rain sensor 110. The rain sensor 110 is therefore very efficient in terms of effective sensing area relative to the size of the rain sensor 110. This is to be contrasted with the prior art rain sensor 10 depicted in FIG. 1, which also includes a total of seven optical elements (i.e., six light emitting elements 12a-f and one light detecting element 17) but is only capable of detecting the presence of moisture at six discrete sensing areas 15a-f. Thus, the rain sensor 110 of the present disclosure provides greater sensitivity and efficiency relative to conventional rain sensors (e.g., the rain sensor 10 in FIG. 1) but can be implemented at a similar cost and in a similar form factor relative to conventional rain sensors.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. An optical rain sensor comprising:
a plurality of light detecting elements and a plurality of peripheral light emitting elements disposed on a printed circuit board (PCB) and surrounding a central light emitting element disposed on the PCB;
wherein, in a first mode of operation, the central light emitting element is configured to emit light beams toward a transparent substrate which reflects the light beams toward each of the plurality of light detecting elements; and
wherein, in a second mode of operation, each of the peripheral light emitting elements is configured to emit light beams toward the plurality of light detecting elements.

2. The optical rain sensor of claim 1, further comprising a controller operatively connected to the light detecting elements, the peripheral light emitting elements, and the central light emitting element.

3. The optical rain sensor of claim 2, wherein the controller is adapted to compare an output of the light detecting elements in the first mode of operation to an output of the light detecting elements in the second mode of operation.

4. The optical rain sensor of claim 1, further comprising a collimating lens and a focusing lens disposed along a path extending between the central light emitting element and one of the plurality of light detecting elements.

5. The optical rain sensor of claim 1, further comprising a collimating lens and a focusing lens disposed along a path extending between one of the plurality of peripheral light emitting elements and one of the plurality of light detecting elements.

6. The optical rain sensor of claim 1, wherein the plurality of light detecting elements comprises three light detecting elements arranged in an equilateral triangle configuration.

7. The optical rain sensor of claim 6, wherein the plurality of peripheral light emitting elements comprises three light emitting elements arranged in an equilateral triangle configuration.

8. The optical rain sensor of claim 7, wherein the plurality of light detecting elements and the plurality of peripheral light emitting elements are concentric and are rotationally offset by 60 degrees relative to one another.

9. The optical rain sensor of claim 1, wherein the PCB, the plurality of light detecting elements, the plurality of peripheral light emitting elements, and the central light emitting element are disposed within a housing having a transparent cover.

10. The optical rain sensor of claim 9, wherein the housing is filled with a transparent compound having an index of refraction equal to an index of refraction of the transparent cover.

11. The optical rain sensor of claim 1, wherein the plurality of peripheral light emitting elements and the central light emitting element are light emitting diodes (LEDs) that emit infrared light.

12. The optical rain sensor of claim 1, wherein the plurality of light detecting elements, the plurality of peripheral light emitting elements, and the central light emitting element are associated with nine discrete sensing areas on an automobile windshield.

13. An optical rain sensor comprising:
four light emitting elements disposed on a printed circuit board (PCB), wherein three of the light emitting elements are disposed at respective corners of a first imaginary equilateral triangle and a fourth light emitting element is disposed at a center of the first imaginary equilateral triangle;
three light detecting elements disposed on the PCB at respective corners of a second imaginary equilateral triangle, wherein the second imaginary equilateral triangle is concentric with, and is rotationally offset by 60 degrees relative to, the first imaginary equilateral triangle;

wherein, in a first mode of operation, the light emitting element the center of the first imaginary equilateral triangle is configured to emit three separate light beams toward a transparent substrate which reflects the light beams toward each of the three light detecting elements, respectively; and wherein, in a second mode of operation, the light emitting elements at the corners of the first imaginary equilateral triangle are each configured to emit two separate light beams toward a nearest two of the light detecting elements.

14. The optical rain sensor of claim 13, further comprising a controller operatively connected to the light detecting elements and the light emitting elements for providing power to, and directing the operation of, the light detecting elements and the light emitting elements.

15. The optical rain sensor of claim 14, wherein the controller is adapted to compare an output of the light detecting elements in the first mode of operation to an output of the light detecting elements in the second mode of operation.

16. The optical rain sensor of claim 13, further comprising a collimating lens and a focusing lens disposed along a path extending between the fourth light emitting element and one of the light detecting elements.

17. The optical rain sensor of claim 13, further comprising a collimating lens and a focusing lens disposed along a path extending between one of the three light emitting elements at the corners of the first imaginary equilateral triangle and one of the of light detecting elements.

18. The optical rain sensor of claim 13, wherein the PCB, the light detecting elements, and the light emitting elements are disposed within a housing having a transparent cover.

19. The optical rain sensor of claim 18, wherein the housing is filled with a transparent compound having an index of refraction equal to an index of refraction of the transparent cover.

20. The optical rain sensor of claim 13, wherein the light emitting elements are light emitting diodes (LEDs) that emit infrared light.

* * * * *